(12) United States Patent
Miyamoto et al.

(10) Patent No.: US 10,183,434 B2
(45) Date of Patent: Jan. 22, 2019

(54) CONVEYING DEVICE

(71) Applicant: TOYO TIRE & RUBBER CO., LTD., Osaka-shi, Osaka (JP)

(72) Inventors: Ryoshi Miyamoto, Osaka (JP); Sousuke Tsubotani, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 427 days.

(21) Appl. No.: 14/182,375

(22) Filed: Feb. 18, 2014

(65) Prior Publication Data

US 2014/0260863 A1    Sep. 18, 2014

(30) Foreign Application Priority Data

Mar. 18, 2013  (JP) ................................. 2013-055313

(51) Int. Cl.
*B65G 13/02*    (2006.01)
*B65G 13/08*    (2006.01)
(Continued)

(52) U.S. Cl.
CPC ............... *B29C 47/34* (2013.01); *B26D 7/02* (2013.01); *B26D 7/0666* (2013.01); *B29C 47/0004* (2013.01); *B29C 47/0035* (2013.01); *B29C 47/92* (2013.01); *B65G 13/02* (2013.01); *B65G 13/08* (2013.01); *B26D 1/04* (2013.01);
(Continued)

(58) Field of Classification Search
CPC .... B65G 13/02; B65G 13/08; B29D 30/0016; B29D 30/0038; B29D 30/0044; B29D 30/46; B29D 30/48; B29D 2030/463; B29D 2030/466; B29D 2030/481;
(Continued)

(56) References Cited

U.S. PATENT DOCUMENTS 1,643,999 A * 10/1927 Semple .................. B29C 47/34
                                                     118/309
3,967,788 A *  7/1976 Ponce .................. G03B 21/325
                                                     242/326.3
(Continued)

FOREIGN PATENT DOCUMENTS

DE    1652597    *  1/1968  ............... B21C 1/14
JP    60-236803 A    11/1985
(Continued)

OTHER PUBLICATIONS

Machine generated English language translatiion of KR 2010-0056596 (original document dated May 2010).*
(Continued)

*Primary Examiner* — Martin K Rogers
(74) *Attorney, Agent, or Firm* — Westerman, Hattori, Daniels & Adrian LLP

(57) ABSTRACT

A conveying device for conveying a rubber member extruded in a curved state from an extrusion device, the device including a support and a plurality of rollers which are spirally arranged around the support to constitute a spiral conveying path and which rotate while supporting a lower surface of the rubber member, wherein an outer diameter of each of the rollers increases from one end to the other end in an axial direction, the one end being rotatably fixed to the support, and the plurality of rollers include drive rollers which rotate and drive.

8 Claims, 7 Drawing Sheets

(51) Int. Cl.
*B29D 30/48* (2006.01)
*B29C 47/34* (2006.01)
*B26D 7/06* (2006.01)
*B29C 47/00* (2006.01)
*B29C 47/92* (2006.01)
*B26D 7/02* (2006.01)
*B29K 7/00* (2006.01)
*B26D 1/04* (2006.01)

(52) U.S. Cl.
CPC .......... *B29C 47/0066* (2013.01); *B29D 30/48* (2013.01); *B29K 2007/00* (2013.01); *Y10T 83/6582* (2015.04)

(58) Field of Classification Search
CPC ...... B29D 2030/482; B29D 2030/0038; B29D 2030/0044; Y10T 83/6582
See application file for complete search history.

(56) References Cited

U.S. PATENT DOCUMENTS

| | | | | |
|---|---|---|---|---|
| 4,011,976 | A | * | 3/1977 | Greer ................... B65H 23/042 226/117 |
| 4,832,098 | A | | 5/1989 | Palinkas et al. |
| 4,921,029 | A | | 5/1990 | Palinkas et al. |
| 5,273,600 | A | | 12/1993 | Yamamori et al. |
| 5,373,935 | A | * | 12/1994 | Anderson ............... B65G 39/12 198/808 |
| 5,401,154 | A | * | 3/1995 | Sargent ................... B29B 11/10 264/108 |
| 6,524,416 | B1 | | 2/2003 | Kubinski et al. |
| 2002/0179400 | A1 | * | 12/2002 | Dersham ................ B65G 13/04 193/1 |
| 2005/0034804 | A1 | * | 2/2005 | Usami .................... B29D 30/56 156/96 |
| 2005/0186008 | A1 | * | 8/2005 | Imai ........................ B41J 11/70 400/618 |
| 2009/0165958 | A1 | * | 7/2009 | Yoshioka .......... H01L 21/67132 156/379 |

FOREIGN PATENT DOCUMENTS

| | | | | | |
|---|---|---|---|---|---|
| JP | | 02-162028 | * | 6/1990 | ............ B29D 30/48 |
| JP | | 2-179503 | A | 7/1990 | |
| JP | | 2-185432 | | 7/1990 | |
| JP | | 8-118515 | A | 5/1996 | |
| JP | | 2002-527269 | A | 8/2002 | |
| JP | | 2003-072926 | A | 3/2003 | |
| JP | | 2011-183750 | A | 9/2011 | |
| KR | | 2010-0056596 | * | 5/2010 | ............ B29D 30/32 |
| WO | WO 01/17761 | | * | 3/2001 | ............ B29D 30/48 |

OTHER PUBLICATIONS

Machine generated English language translation of JP 02-162028 (original document dated Jun. 1990).*
English language Abstract of DE 1652597 (original document dated Jan. 1968).*
Office Action dated Sep. 28, 2016, issued in counterpart Japanese Patent Application No. 2013-055313, with English translation. (6 pages).

* cited by examiner

CONVEYING DEVICE

BACKGROUND OF THE INVENTION

Field of the Invention

The present invention relates to a conveying device for conveying a rubber member extruded in a curved state from an extrusion device.

Description of the Related Art

In the manufacture of pneumatic tires, the following method is frequently used when an annular bead filler is molded. That is, a bead filler having a predetermined cross-sectional shape is straightly extruded, the bead filler is wound around an outer peripheral side of a bead wire, and ends thereof are bonded to each other. However, when the bead filler is wound around the bead wire, a tensile force is generated due to a difference between an inner periphery and an outer periphery of the bead filler, and the tensile force causes problems that the outer periphery of the bead filler is bent or thinned, the bonded portion is peeled off, and cut rubber is generated.

In order to solve these problems, in JP 2002-527269 A, a straightly extruded bead filler is spirally wound around a drum such that an inner diameter of the bead filler becomes smaller than an outer diameter of the bead wire and thereafter, the spiral bead filler is detached from the drum to loosen its spiral state, thereby making the tensile force moderate. In JP 8-118515 A, a straightly extruded bead filler is spirally wound, and the wound bead filler is cooled by cooling water, thereby moderating internal stress.

In JP 2002-527269 A, the straightly extruded bead filler is caused to pass through a forming member having an opening corresponding to a cross-sectional shape of the bead filler, so that the bead filler is spirally formed while maintaining the cross-sectional shape. Hence, in the case of viscous rubber, a surface of the bead filler which is in contact with the forming member is likely to be varied in shape. Particularly, in the case of a bead filler which has thin cross-sectional shape and large height, it is extremely difficult to form the bead filler while maintaining a desired cross-sectional shape. Moreover, in JP 8-118515 A, since the bead filler is wound between two drums arranged side by side and is cooled in this state, the bead filler is extended between the two drums.

Hence, when an annular bead filler is molded, instead of employing a method in which a bead filler straightly extruded from the extrusion device is curved annularly, it is preferable to employ a method in which a bead filler is extruded from an extrusion device in a state where the bead filler is curved to a desired curvature, and the bead filler is molded annularly while maintaining the curvature. However, it is difficult to convey the curved extruded bead filler to a molding machine while maintaining its curvature.

SUMMARY OF THE INVENTION

It is therefore an object of the present invention to provide a conveying device capable of conveying a rubber member extruded in a curved state from an extrusion device while maintaining its curvature.

The above object can be achieved by the following invention.

That is, the present invention provides a conveying device for conveying a rubber member extruded in a curved state from an extrusion device, the device including:

a support; and a plurality of rollers which are spirally arranged around the support to constitute a spiral conveying path and which rotate while supporting a lower surface of the rubber member, wherein an outer diameter of each of the rollers increases from one end to the other end in an axial direction, the one end being rotatably fixed to the support, and the plurality of rollers include drive rollers which rotate and drive.

According to the conveying device of the present invention, the plurality of rollers are spirally arranged around the support to constitute the spiral conveying path. The plurality of rollers rotate while supporting the lower surface of the rubber member extruded from the extrusion device. Accordingly, the rubber member can be conveyed along the conveying path. The rubber member extruded in the curved state is conveyed along the spiral conveying path. Accordingly, the rubber member can be conveyed while maintaining its curvature. Each of the rollers has such a shape that its outer diameter increases from one end to the other end in the axial direction, and the one end is rotatably fixed to the support. Thus, a gap between adjacent rollers can be narrowed. Further, since the plurality of rollers respectively have the drive rollers, it is possible to reliably convey the rubber member. Accordingly, it is possible to appropriately convey the rubber member while maintaining its curvature.

In the conveying device according to the present invention, it is preferable that a cutting unit for cutting the rubber member is provided between adjacent two of the rollers.

According to this configuration, it is possible to convey the rubber member while maintaining its curvature and to cut the rubber member into a desired length.

In the conveying device according to the present invention, it is preferable that two fixing tools capable of holding the rubber member with the two rollers are respectively provided upstream and downstream of the cutting unit in a conveying direction.

According to this configuration, since the rubber member can be fixed at the upstream and the downstream of the cutting unit in the conveying direction, it is possible to accurately cut the rubber member when the rubber member is cut by the cutting unit.

In the conveying device according to the present invention, it is preferable that the plurality of rollers include free rollers each having the other end rising with the one end as a fulcrum, the free rollers being located upstream of the cutting unit in the conveying direction, each of the free rollers rises at a rising speed in accordance with a conveying speed upstream of the free roller in the conveying direction.

According to this configuration, a free roller rises at the rising speed in accordance with the conveying speed upstream of the free roller in the conveying direction. Accordingly, it is possible to stop the conveyance of the rubber member toward the downstream of the free roller in the conveying direction. Since the cutting unit is located downstream of the free roller in the conveying direction, it is possible to accurately cut the rubber member when the rubber member is cut by the cutting unit.

DETAILED DESCRIPTION OF THE PREFERRED EMBODIMENTS

Figure 1:
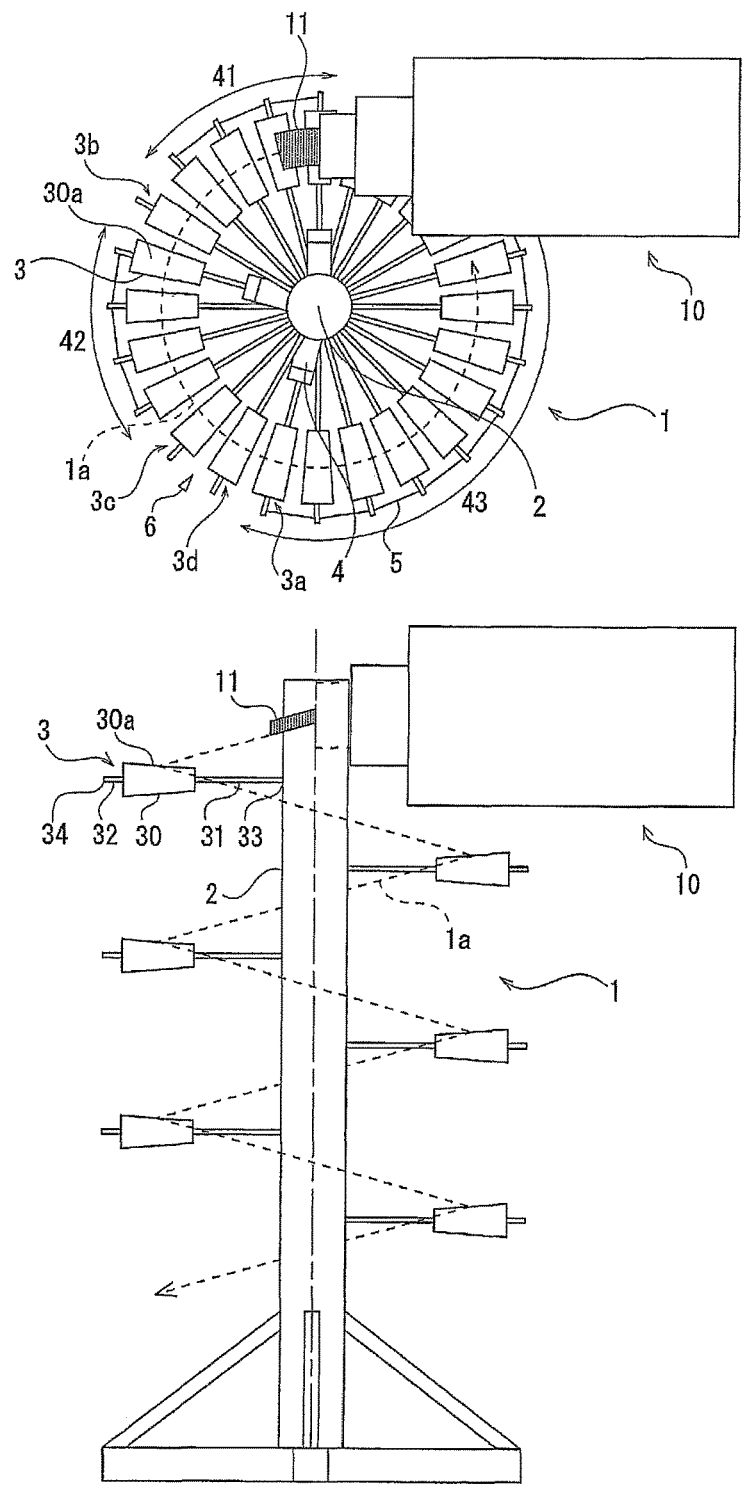
FIG. 1 is a plan view and a front view showing an entire conveying device of the present invention.

Embodiments of the present invention will be described below with reference to the drawings. FIG. 1 is a plan view and a front view showing an entire conveying device. A conveying device 1 of the present invention is for conveying a rubber member 11 extruded in a curved state from an extrusion device 10.

The extrusion device 10 only needs to extrude the rubber member 11 in the curved state, and various types of extrusion devices can be employed. Examples of the extrusion device 10 include: an extrusion device (device described in JP 2007-237596 A) in which a gear pump which sends out rubber extruded from an extrusion machine to a molding base is configured by a helical gear, and a rubber member extruded from the molding base is curved; an extrusion device (device described in JP 2008-246880 A) in which lengths of a pair of opposed lands in a molding base are made different from each other, thereby curving a rubber member which is extruded from the molding base; and an extrusion device (device described in JP 2009-61691 A) in which a larger amount of rubber is caused to flow into an outer periphery of an opening of a molding base than that of an inner periphery of the opening of the molding base using a plurality of extrusion machines, thereby curving a rubber member extruded from the molding base.

In the present embodiment, the rubber member 11 extruded from the extrusion device 10 has a cross-sectional shape which is thin in thickness in the vertical direction and wide in width in the horizontal direction. The rubber member 11 is curved in the width direction.

The conveying device 1 includes a support 2 and a plurality of rollers 3 which are arranged spirally around the support 2 to constitute a conveying path 1a. The rollers 3 rotate while supporting a lower surface of the rubber member 11. The support 2 extends from a pedestal upward in the vertical direction. Here, as shown in FIG. 1, the conveying path 1a spirally extends downwardly from above to surround peripheries of the support 2, and the rubber member 11 can be spirally conveyed downwardly from above.

The plurality of rollers 3 are sequentially arranged downwardly from above at positions slightly shifted from one another in a circumferential direction, and arranged roller surfaces 30a constitute the spiral conveying path 1a. The front view in FIG. 1 shows only some of the plurality of rollers 3.

Each of the rollers 3 is configured by a roller portion 30, and a first shaft portion 31 and a second shaft portion 32 which are respectively formed on one end 33 and the other end 34 of the roller portion 30. The first shaft portion 31 and the second shaft portion 32 extend in a radial direction of the spiral shape. The roller portion 30 is tapered such that an outer diameter thereof is reduced from the other end 34 to the one end 33 in the axial direction. A tapered degree is determined while taking into account a circumferential speed which is varied by a distance from the center of the spiral shape.

The one end 33 of the roller 3 in the axial direction, more specifically, an end of the first shaft portion 31 is rotatably fixed to the support 2. The first shaft portion 31 and the second shaft portion 32 are directed substantially horizontally. Accordingly, the roller surfaces 30a of the roller portion 30 are inclined with respect to a horizontal plane.

The plurality of rollers 3 includes a drive roller 3a which rotates and drives. In the present embodiment, three drive roller groups each including the plurality of drive rollers 3a are provided. These drive roller groups are defined as a first drive roller group 41, a second drive roller group 42, and a third drive roller group 43 arranged in this order from upstream to downstream in the conveying direction. At least one of the drive rollers 3a in each of the drive roller groups is rotated and driven by a motor 4. A drive force of the motor 4 is transmitted to other drive rollers 3a through an endless belt or an endless chain 5 which connects second shaft portions 32 of the adjacent drive rollers 3a to each other. Accordingly, the plurality of drive rollers 3a included in the same drive roller group can rotate with the same number of rotations.

The plurality of rollers 3 include a first free roller 3b. The first free roller 3b is located upstream of a later-described cutter 6 in the conveying direction, and is located between the first drive roller group 41 and the second drive roller group 42.

The first free roller 3b is configured such that the other end 34 rises with the one end 33 in the axial direction as a fulcrum. The first free roller 3b can rise at a rising speed in accordance with a conveying speed of upstream of the first free roller 3b in the conveying direction, more specifically at a rising speed in accordance with a conveying speed of the first drive roller group 41. Since the first free roller 3b rises with the support 2 which is also the center of the spiral conveying path 1a as a fulcrum, excessive force is not applied to the rubber member 11 and a shape thereof is not deformed.

In the present embodiment, a second free roller 3c and a third free roller 3d are provided between the second drive roller group 42 and the third drive roller group 43. The conveying device 1 includes two fixing tools capable of holding the rubber member 11 with the second free roller 3c or the third free roller 3d. One of the fixing tools which holds the rubber member 11 with the second free roller 3c is defined as a first fixing tool 71, and the other fixing tool which holds the rubber member 11 with the third free roller 3d is defined as a second fixing tool 72 (see FIG. 2D). The first fixing tool 71 and the second fixing tool 72 are each configured to be movable between a holding posture for holding the rubber member 11 from above with the second free roller 3c or the third free roller 3d, and a standby posture for retracting upward from the second free roller 3c or the third free roller 3d to release the rubber member 11.

The first fixing tool 71 and the second fixing tool 72 of the present embodiment substantially have the same shape as that of the roller portion 30 of the roller 3. However, the shapes of the first fixing tool 71 and the second fixing tool 72 are not particularly limited as long as the rubber member 11 can be held with the second free roller 3c or the third free roller 3d.

The cutter 6 (corresponding to a cutting unit) for cutting the rubber member 11 is provided between the adjacent second free roller 3c and third free roller 3d. The cutter 6 can slide in the radial direction of the spiral shape.

A method for conveying the rubber member 11 extruded from the extrusion device 10 downwardly from above using the conveying device 1 will be described below. FIGS. 2A to 2H are plan views schematically showing the conveying method of the rubber member 11.

The extrusion device 10 can continuously extrude the rubber member 11 in a state where the rubber member 11 is curved to a predetermined curvature. An extrusion speed of the rubber member 11 from the extrusion device 10 is defined as v1.

Figure 2A:
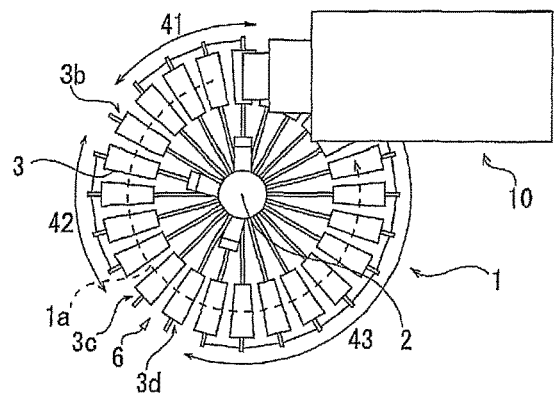
FIG. 2A is a plan view schematically showing a conveying method of a rubber member.
Figure 2B:
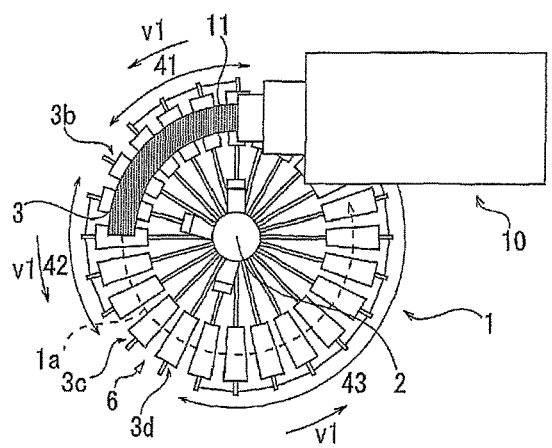
FIG. 2B is a plan view schematically showing the conveying method of the rubber member.
Figure 2C:
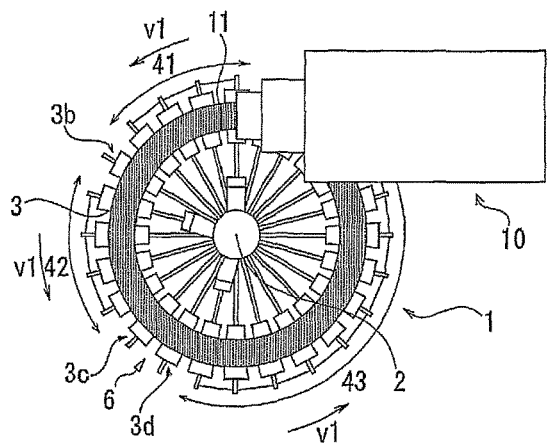
FIG. 2C is a plan view schematically showing the conveying method of the rubber member.

As shown in FIGS. 2A to 2C, the continuously extruded rubber member 11 is conveyed along the spiral conveying path 1a by the first drive roller group 41, the second drive roller group 42, and the third drive roller group 43. At this time, the conveying speed of the first to third drive roller groups 41 to 43 is v1, which is the same as the extrusion speed of the extrusion device 10. Accordingly, the rubber member 11 extruded in a curved state from the extrusion device 10 can be conveyed downwardly from above while maintaining its curvature.

Figure 2D:
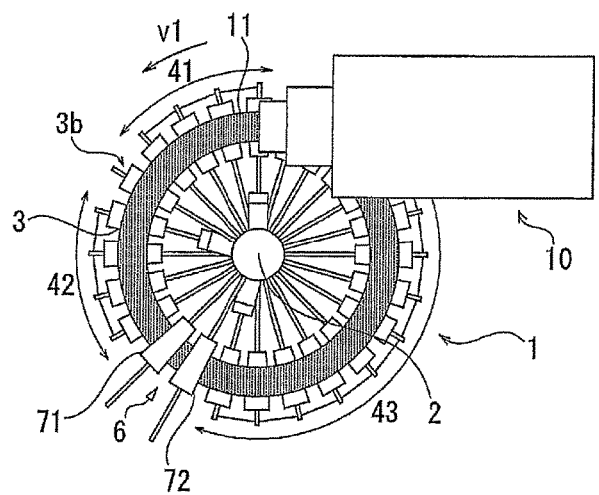
FIG. 2D is a plan view schematically showing the conveying method of the rubber member.

If the rubber member 11 located downstream of the cutter 6 in the conveying direction has a desired length, e.g., one circumference of the spiral shape, the cutter 6 forwardly moves inward in the radial direction of the spiral shape to cut the rubber member 11. At this time, as shown in FIG. 2D, the second drive roller group 42 located upstream of the cutter 6 in the conveying direction and the third drive roller group 43 located downstream of the cutter 6 in the conveying direction stop rotating. Further, the first fixing tool 71 and the second fixing tool 72 move from the standby posture to the holding posture, and fix the rubber member 11 upstream and downstream of the cutter 6 in the conveying direction. Accordingly, it is possible to accurately cut the rubber member 11.

Figure 2E:
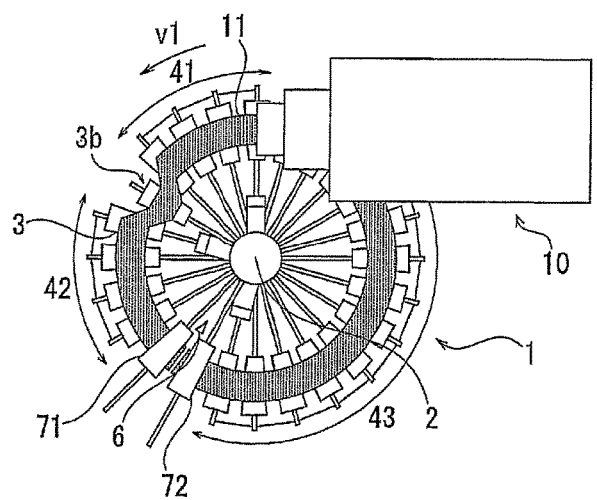
FIG. 2E is a plan view schematically showing the conveying method of the rubber member.

At this time, the rubber member 11 is continuously extruded from the extrusion device 10 at the extrusion speed v1, and the rubber member 11 is continuously conveyed by the first drive roller group 41 at the conveying speed v1. If the second drive roller group 42 stops rotating, the rubber member 11 starts to be accumulated at a portion of the second drive roller group 42. Hence, as shown in FIG. 2E, the first free roller 3b is made to rise at a rising speed in accordance with the conveying speed v1 of the first drive roller group 41. Accordingly, since it is possible to stop the conveyance of the rubber member 11 toward the downstream of the first free roller 3b in the conveying direction, it is possible to prevent the rubber from being accumulated at the portion of the second drive roller group 42.

Figure 2F:
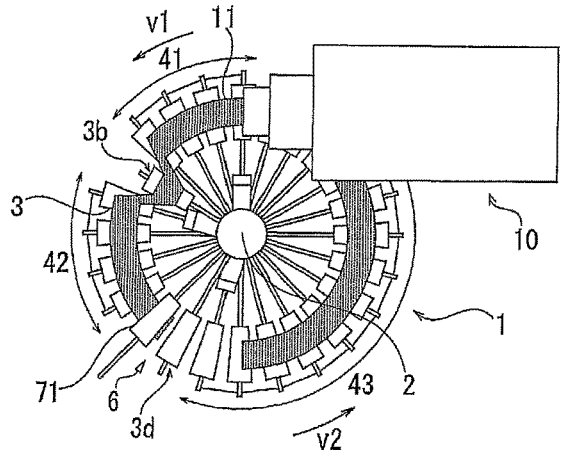
FIG. 2F is a plan view schematically showing the conveying method of the rubber member.

Next, as shown in FIG. 2F, if the cutting of the rubber member 11 is completed, the cutter 6 retracts radially outward of the spiral shape. The second fixing tool 72 located downstream of the cutter 6 in the conveying direction moves from the holding posture to the standby posture and releases the rubber member 11. The third drive roller group 43 then resumes the conveyance of the rubber member 11 at a conveying speed v2 which is equal to or faster than v1.

Figure 2G:
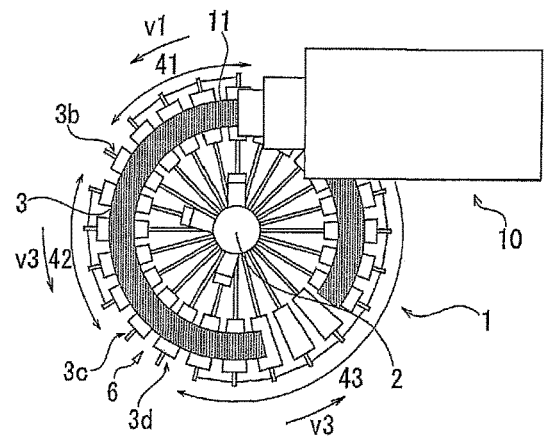
FIG. 2G is a plan view schematically showing the conveying method of the rubber member.

Next, as shown in FIG. 2G, the first fixing tool 71 located upstream of the cutter 6 in the conveying direction moves from the holding posture to the standby posture. The second drive roller group 42 resumes the conveyance of the rubber member 11 at a conveying speed v3 which is faster than v1, and the conveying speed of the third drive roller group 43 is also changed from v2 to v3. At the same time, the first free roller 3b is lowered at a lowering speed in accordance with a difference between the conveying speed v3 of the second drive roller group 42 and the conveying speed v1 of the first drive roller group 41. Accordingly, the rubber member 11 accumulated in the first free roller 3b is gradually conveyed to the second drive roller group 42.

Figure 2H:
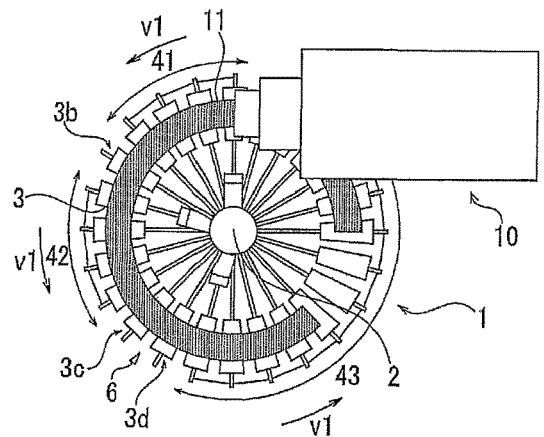
FIG. 2H is a plan view schematically showing the conveying method of the rubber member.

The first free roller 3b is lowered to the original position and if the accumulation of the rubber member 11 is completely eliminated, the conveying speed of the second drive roller group 42 and the third drive roller group 43 is changed to v1 as shown in FIG. 2H.

According to the above conveying method, the rubber member 11 which is continuously extruded in the curved state from the extrusion device 10 can be conveyed downwardly from above while maintaining its curvature.

According to the conveying device 1 shown in FIG. 1, the spiral conveying path 1a is about a length of three circumferences of the spiral shape, but if the number of the circumferences is increased, a plurality of cut rubber members 11 can be stocked on the conveying path 1a.

Figure 3:
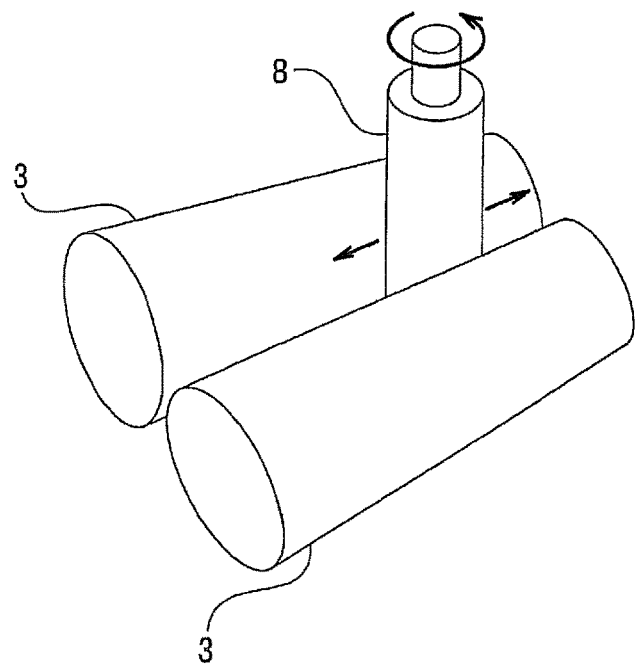
FIG. 3 is a perspective view of rollers according to another embodiment.

Other Embodiments (1) In the conveying device of the present invention, it is preferable that a guide roller 8 for limiting movement of the rubber member 11 toward an inner peripheral side is provided between the adjacent rollers 3, as shown in FIG. 3. The guide roller 8 is a free roller. The guide roller 8 can limit the movement of the rubber member 11 toward the inner peripheral side, and it is possible to accurately convey the rubber member 11 along the spiral conveying path 1a around the support 2. The guide roller 8 is configured so as to be movable in the radial direction of the spiral shape, and it is possible to adjust a position of the guide roller 8 in accordance with a curvature of the rubber member 11 extruded from the extrusion device 10.

(2) The second free roller 3c and the third free roller 3d are not necessarily required to be free rollers, and may be drive rollers respectively included in the second drive roller group 42 and the third drive roller group 43.

(3) A shape of the rubber member 11 is not particularly limited, but the conveying device of the present invention is useful in conveying a rubber member which has a thick and wide cross-sectional shape and which is curved in the width direction. The conveying device is particularly useful in conveying a rubber member extruded in a curved state from the extrusion device to mold an annular bead filler having a substantially triangular cross-section which is vertically long in the radial direction.

Figure 4:
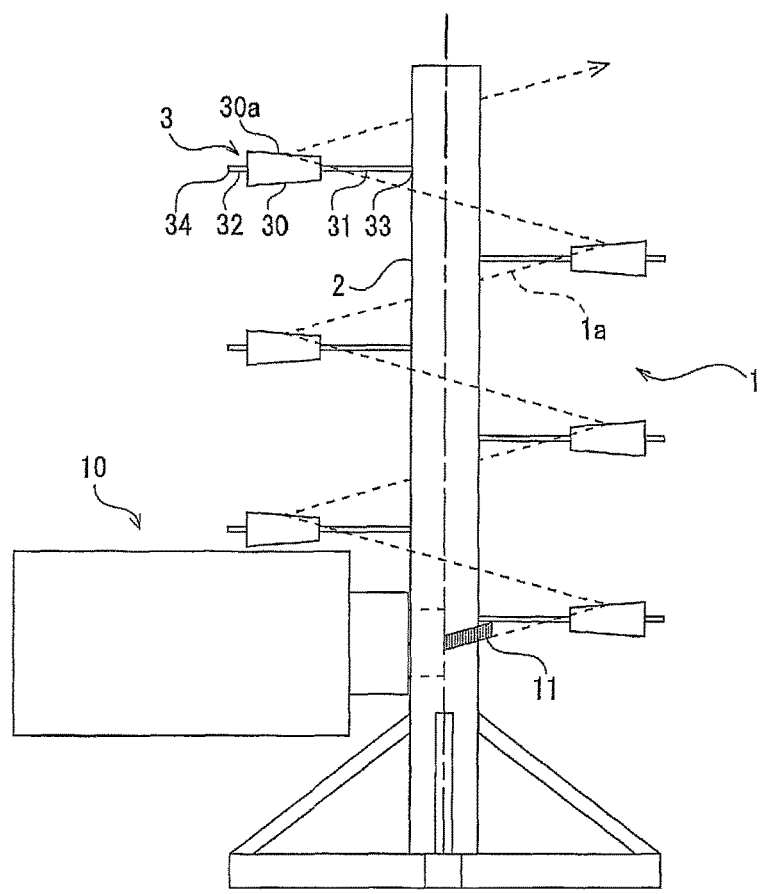
FIG. 4 is a front view of a conveying device according to another embodiment.

(4) In the above embodiment, the example has been shown in which the conveying device 1 conveys the rubber member 11 extruded from the extrusion device 10 downwardly from above. Alternatively, as shown in FIG. 4, the conveying device of the present invention may convey, upwardly from below, the rubber member 11 extruded from the extrusion device 10 which is arranged below.

Figure 5:
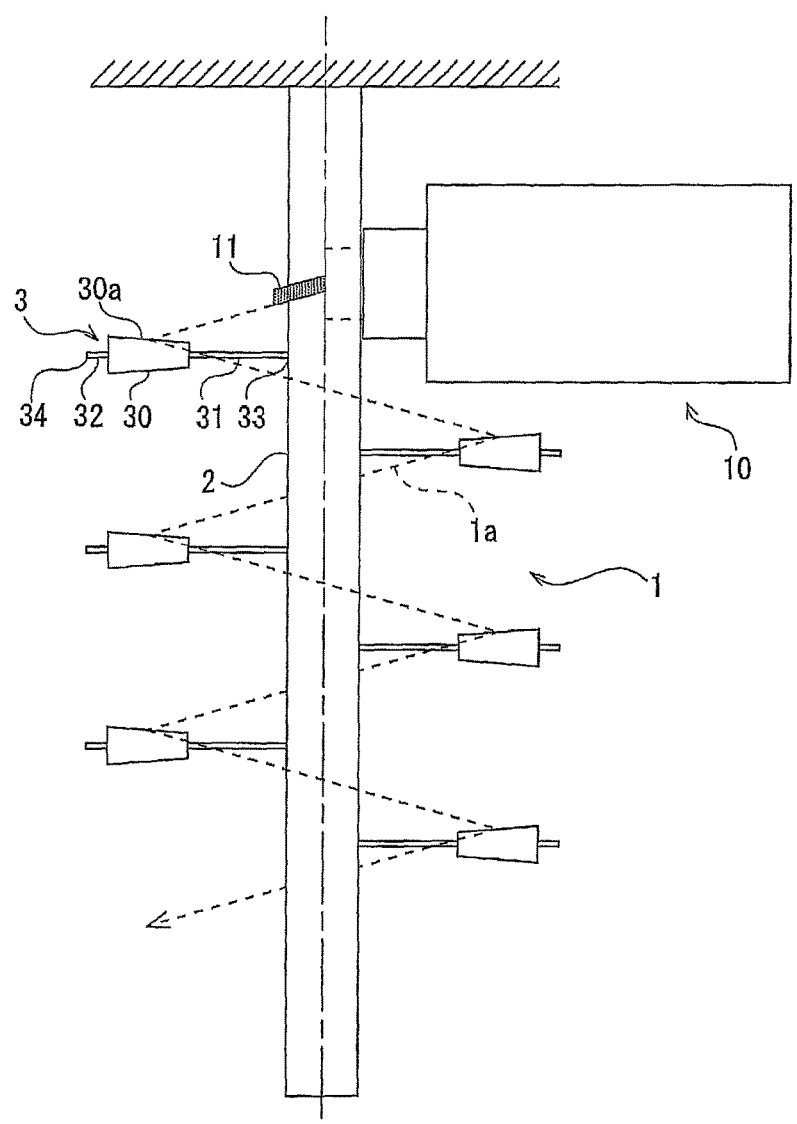
FIG. 5 is a front view of a conveying device according to yet another embodiment.

(5) In the above embodiment, the support 2 extends upward from the pedestal in the vertical direction. However, the present invention is not limited thereto. The support 2 may be hung from above, as shown in FIG. 5.

What is claimed is:

1. A conveying device for conveying a rubber member extruded in a curved state from an extrusion device, the conveying device comprising:

a support; and a plurality of rollers which are spirally arranged around the support to constitute a spiral conveying path and which are provided to rotate while supporting a lower surface of the rubber member, wherein the support extends vertically at a center of the spiral conveying path, an outer diameter of each of the rollers increases from one end to the other end in an axial direction, the one end being rotatably fixed to the support, the plurality of rollers includes drive rollers which are configured to rotate and drive, a cutting unit for cutting the rubber member is provided between two of the rollers, the plurality of rollers includes a free roller located upstream of the cutting unit in a conveying direction, and the free roller has an outer end and a base end that is pivotally supported at a fulcrum on the support such that the outer end is pivotable upward from its position in the spiral path to a vertically higher raised position, the conveying device being configured such that (a) the free roller can pivotally rise around the fulcrum to said raised position at a rising speed in accordance with a conveying speed upstream of the free roller in the conveying direction and such that (b) conveyance of the rubber member downstream of the free roller can be stopped concurrently during conveying of the rubber member upstream of the free roller while preventing the rubber member from accumulating downstream of the free roller due to stopping of the conveyance of the rubber member downstream of the free roller by allowing the free roller to pivotally rise around the fulcrum at the rising speed in accordance with the conveying speed upstream of the free roller.

2. The conveying device according to claim 1, wherein two fixing tools configured to hold the rubber member with the two rollers are respectively provided upstream and downstream of the cutting unit in the conveying direction.

3. The conveying device according to claim 1, the free roller is configured to move laterally to the conveying path at the rising speed corresponding to the conveying speed upstream of the free roller.

4. The conveying device according to claim 1, wherein said plurality of rollers includes a plurality of drive roller groups, each of said drive roller groups including a respective set of adjacent ones of said plurality of rollers, and wherein said two of the rollers includes a) a roller in one of said drive roller groups, the one of the said drive roller groups being upstream of said cutting unit, and b) a roller in another of said drive roller groups, said another drive roller group being downstream of the cutting unit, and wherein said conveying device is configured to separately control conveying speeds of drive rollers in said one of said drive roller groups from drive rollers in said another of said drive roller groups during cutting by said cutting unit.

5. The conveying device according to claim 4, wherein said free roller is configured to move laterally to the conveying path at the rising speed corresponding to the conveying speed upstream of the free roller.

6. The conveying device according to claim 5, wherein two fixing tools configured to hold the rubber member with the two rollers are respectively provided upstream and downstream of the cutting unit in the conveying direction.

7. The conveying device according to claim 1, wherein said support is mounted on a pedestal.

8. The conveying device according to claim 1, wherein said support is configured to be hung from above.

* * * * *